Feb. 1, 1966 L. S. RAYNER 3,232,918
POLYOLEFINES MOLECULAR WEIGHT REDUCTION PROCESS
Filed March 17, 1961
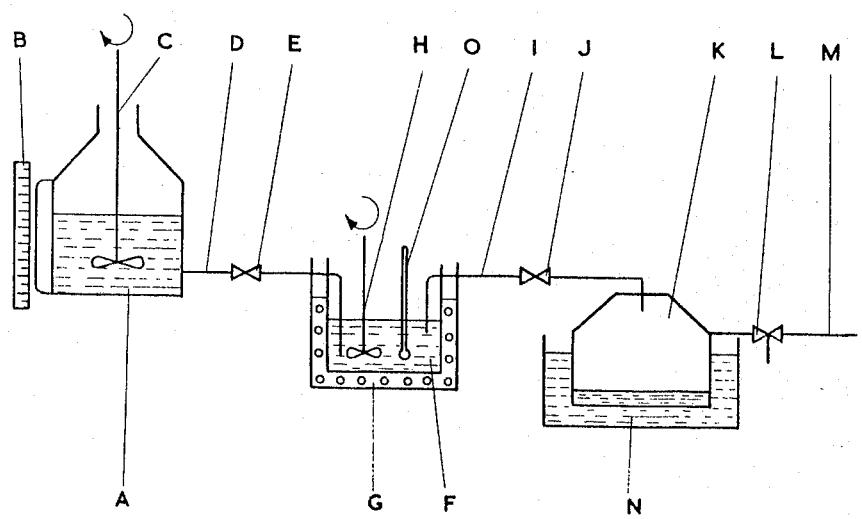
INVENTOR
LAURENCE STEPHEN RAYNER
BY Cushman, Darby & Cushman
ATTORNEYS United States Patent Office 3,232,918
Patented Feb. 1, 1966

3,232,918
POLYOLEFINES MOLECULAR WEIGHT REDUCTION PROCESS
Laurence Stephen Rayner, Welwyn Garden City, England, assignor to Imperial Chemical Industries Limited, London, England, a corporation of Great Britain
Filed Mar. 17, 1961, Ser. No. 96,465
Claims priority, application Great Britain, Mar. 18, 1960, 9,640/60
18 Claims. (Cl. 260—937)

This invention relates to a controlled thermal degradation process for reducing the molecular weight of crystalline polymers of aliphatic mono-α-olefines.

Many processes have been proposed for the polymerisation of aliphatic mono-α-olefines such as ethylene, propylene, butene-1, poly-3-methyl butene-1 and poly-4-methyl pentene-1 to high molecular weight polymers.

The more recently proposed low pressure processes usually lead to a mixture of highly crystalline and less crystalline or amorphous polymers as a slurry of fine particles in an inert diluent or in the liquid monomer in which the crystalline polymer is often of very high molecular weight which may be over a hundred thousand, or even a million or more.

These crystalline polymers are very desirable products in view of their exceptional chemical resistance and their excellent electrical and mechanical properties; it has however been found hitherto that many of the commonest processes of fabrication, such as extrusion and injection moulding, cannot be conveniently applied to the polymers of very high molecular weight owing to the very high melt viscosity and consequently poor flow properties of these polymers.

It is therefore frequently necessary to submit these high molecular weight polymers which may have for example a melt index of from about 0.01 to about 1 to a degradation treatment in order to lower their viscosity.

Previous proposals have been for processes involving the mastication of the polymer normally in the presence of air in, for example, an extruder. It takes time for mastication equipment to settle to constant running conditions and polymer treated during this time varies in properties, particularly flow properties, and is therefore only of small commercial value.

These processes also require the use of expensive equipment and considerable amounts of heat and power.

It is an object of the present invention to reduce waste of polymer treated and also to reduce the consumption of heat and power and to make possible the use of simpler and less expensive equipment. It is another object to obtain treated polymer in powder form which is very suitable for colour compounding.

According to the present invention we provide a process for the controlled thermal degradation of a crystalline polymer of an aliphatic mono-α-olefine which comprises heating the said crystalline polymer as a slurry with water containing oxygen and including free radicals at a temperature of from 60 to 250° C. and recovering from the slurry a polymer of increased melt index.

It is preferred that the aqueous slurry should also contain a wetting agent in order to aid the dispersion of the polymer in the water. A non-ionic emulsifier such as a polyethylene oxide condensate is preferred to an ionic emulsifier since residual traces of it do not interfere as much with the subsequent use of the polymer for electrical purposes.

For temperatures within the range 60–150° C., polyethylene oxide monostearate is very suitable; for higher temperatures an emulsifier stable to hydrolysis at these temperatures, for example phenoxy poly(ethyleneoxy) ethanol, or polyethylene glycol may be used.

Our process may be carried out at a temperature of less than 100° C. in which case oxygen and a free-radical polymerisation catalyst should be employed. Suitable free-radical polymerisation catalysts for treatments within the temperature range of 60–100° C. are diacyl peroxides, ketone peroxides, tertiary alkyl esters of organic carboxylic peracids, hydroxyalkyl peroxides and azodinitriles, for example, benzoyl peroxide, lauroyl peroxide, methyl ethyl ketone peroxide, cyclohexanone peroxide, hydroxyheptyl peroxide, tertiary butyl peroxybutyrate, tertiary butyl peracetate, tertiarybutyl perbenzoate and azodinitriles such as azodiisobutyronitrile.

If the process is carried out at a temperature of between 100 and 120° C. it may be expedited by oxygen in combination with a less active catalyst for example one having a peroxide or hydroperoxide group or groups attached to tertiary groups which are alkyl, cycloaliphatic, or aralkyl groups, for instance cumene hydroperoxide, tertiary butyl hydroperoxide, tertiary butyl peroxide, p-menthane hydroperoxide or diisopropylbenzene hydroperoxide. Particularly at higher temperatures of for example 120 to 250° C. a free-radical catalyst is, however, not necessary as at these temperatures oxygen has sufficient thermal energy to provide sufficient active oxygen-containing free-radicals. If a free-radical catalyst is used, a very suitable quantity is 0.1–1% by weight of the olefine polymer. Appreciably higher temperatures are not recommended because of the cost of the equipment required.

The presence of metallic salts, such as iron or copper salts, in the water may also effect the rate of treatment. It will generally be preferred, however, to exclude metallic salts by using, for example, glass-lined reaction vessels and water free from these salts, since contamination by them may decrease the oxidation resistance of the product.

The free-radical polymerisation catalyst may be added to the slurry, for example, dissolved in an organic solvent, e.g. benzene.

Sufficient oxygen for our process can be provided by air trapped in the polymer particles or dissolved in the water used.

Our process should be conducted in reaction equipment capable of withstanding pressure if it is conducted above 100° C. Our process is preferably conducted continuously. It may be conducted in a vessel to which slurry is fed and removed continuously but is preferably conducted continuously in a tubular type reactor as this results in polymer of particularly uniform molecular weight.

After our treatment the slurry is normally cooled, the polymer is separated by filtration or centrifuging, washed with water to remove wetting agent and catalyst degradation products, and then dried.

*Example 1*

The following table illustrates the degradation at 95° C. of a 16.7% by weight slurry of a fine powder of crystalline polypropylene dispersed in water containing 0.017% polyethylene oxide monostearate emulsifier and dissolved air. Except where otherwise indicated these slurries were prepared at room temperature, the additive incorporated last and the mixture heated by an isomantle with continuous stirring. Melt indices were determined by the A.S.T.M. method, modified by using a 10 kg. weight instead of that specified for causing extrusion.

| Expt. | Additive (percent wt. based on polypropylene) | Temp., °C. | Melt Index after— | | | | | | | | |
|---|---|---|---|---|---|---|---|---|---|---|---|
| | | | 0 hr. | 1 hr. | 2 hr. | 3 hr. | 4 hr. | 5 hr. | 6 hr. | 7 hr. | 8 hr. |
| Blank: | | | | | | | | | | | |
| 1 | No additive | 95 | <0.1 | | | | <0.1 | | | | |
| 2 | 0.2% benzoyl peroxide/N₂ | 95 | <0.1 | | | | | | [<0.1] | | |
| 3 | 0.4% azodiisobutyronitrile/N₂ | 95 | <0.1 | | | | | | [<0.1] | | |
| Example: | | | | | | | | | | | |
| 1 | 0.2% benzyyl peroxide | 60 | <0.1 | | 2.2 | 2.4 | | | 3.0 | | 4.4 |
| 2 | do | 80 | <0.1 | | 1.0 | 2.1 | | | 8.6 | | 18.4 |
| 3 | do | 95 | <0.1 | 13 | | 24 | 35 | 37 | [40] | | |
| 4 | 0.13 benzoyl peroxide | 95 | <0.1 | 2 | | | 2.9 | 3.4 | 3.3 | [7, 10] | |
| 5 | 0.3% lauroyl peroxide | 95 | <0.1 | 0.8 | | 1.3 | 1.8 | [2.1] | | | |
| 6 | 0.3% azodiisobutyronitrile | 95 | <0.1 | <0.1 | 1.2 | [2.5] | | | | | |
| 7 | 0.4% azodiisobutyronitrile | 95 | <0.1 | | | | | | 5.3 | | |

[ ] Final sample taken from flask after cooling overnight.

It is seen that the change in melt index of the examples with treatment time at 95° C. falls off after 3–4 hr. The final product obtained after slow cooling may be more degraded than would be expected from a graphical plot (see Example 4). This is believed to be due to oxygen being absorbed by the water during cooling. To prevent degradation continuing beyond the desired extent, if it is not convenient to separate the treated polymer from the slurry immediately, the peroxide may be decomposed by the addition of an inhibitor, for example a phenol or bisphenol, 2,6-ditertiary butyl-4-methyl-phenol being convenient for this purpose, a sulphur compound such as a mercaptan, an amine such as triethylene tetramine, or a primary or secondary alcohol.

Very suitably the inhibitor may be added dissolved in a solvent. It is preferred that the weight of inhibitor is at least twice the weight of free-radical catalyst. Alternatively the slurry may be rapidly cooled. In blanks 2 and 3 there was no change in melt index when polymer powder, degassed and then allowed to absorb nitrogen, was slurried under nitrogen with water free from air but containing polyethylene oxide monostearate as wetting agent and benzoyl peroxide or azodiisobutyronitrile and then heated at 95° C. This clearly shows that oxygen trapped in the polymer particles and/or dissolved in the aqueous phase is essential for degradation to occur at 95° C. and that initiation of this process at 95° C. depends on free-radicals.

*Example 2*

20 parts by weight of polypropylene of melt index 0.2 (measured as in Example 1) were slurried in 100 parts by weight of water containing 1 part by weight of polyethylene oxide monostearate emulsifier and dissolved air. Aliquots of the slurry were heated in glass-lined pressure vessels at a temperature of 120° C. for varying times. The various samples were unchanged in appearance by this treatment, but their melt indices (determined as before) were found to have increased markedly, as is shown by the following table:

| Time | Melt Index | Air volume: slurry volume |
|---|---|---|
| 0 | 0.2 | |
| 1 hr. 40 min | 1.2 | 9.4 |
| 2 hrs. 30 min | 2.4 | 9.0 |
| 3 hrs | 5.0 | 14.0 |
| 4 hrs | Ca. 200 | 10.0 |

The figures in the last column indicate the volume of air in the vessel for each volume of slurry.

*Example 3*

Example 1 was repeated, using polypropylene of melt index 0.3, and varying the proportion of benzoyl peroxide added. The results were as follows:

| Benzoyl peroxide (percent by weight based on polypropylene) | Temp., °C. | Melt Index after— | | | | |
|---|---|---|---|---|---|---|
| | | 1 hr. | 2 hrs. | 3 hrs. | 4 hrs. | 5 hrs. |
| 0.25 | 80 | 1.5 | 3.0 | 4.7 | 6.5 | 10.3 |
| 0.5 | 80 | 5.0 | 11.2 | 12.6 | 23 | 27 |
| 0.75 | 80 | 14.4 | 29 | 39 | 60 | 127 |

*Example 4*

Two slurries were prepared, each comprising 20 parts by weight of polypropylene of melt index 0.3 (determined as before), 0.1 part by weight of benzoyl peroxide (dissolved in benzene) and 1 part by weight of polyethylene oxide monostearate (as emulsifier) in 100 parts by weight of water containing dissolved oxygen.

The slurries were heated at 80±2° C. for three hours. At this point, the polypropylene of one slurry had been degraded to a melt index of 6.6, the other to a melt index of 11. Respectively 0.1 and 0.2 part by weight of 2,6-ditertiarybutyl-4-methyl phenol were added to the two slurries, which were allowed to cool. Samples were taken hourly for melt index determination. The results were as follows:

| Phenol (added at 3 hours) | Melt Index after— | | | |
|---|---|---|---|---|
| | 3 hrs. | 4 hrs. | 5 hrs. | 6 hrs. |
| 0.1 part | 6.6 | 6.8 | 14 | 19 |
| 0.2 part | 11 | 14 | 13 | 12 |

The degradation of polypropylene by the process of this invention can therefore be conveniently stopped at any desired point by the addition of sufficient phenolic antioxidant to inactivate the peroxide, and the continued degradation on cooling owing to reabsorption of oxygen by the water, demonstrated in Example 1, can be prevented. As will be seen from the figures above, the amount of phenolic antioxidant added is suitably about twice the weight of peroxide used in the degradation.

In a high temperature degradation, in which a peroxide is not used, as for instance in Example 2, it may be advisable to add smaller quantities of antioxidant at the end of the degradation to inactivate any unstable reaction products of the polymer and oxygen which could catalyse further degradation. Alternatively the slurry may be rapidly cooled.

In continuous or semi-continuous operation antioxidant may be continuously added to or initially placed in the receiver for the treated slurry.

Example 5

This example demonstrates a laboratory-scale continuous process for the degradation of polypropylene.

Polypropylene powder (1 kg., melt index 0.2, determined as before) was slurried with benzoyl peroxide (2.5 g.) in water (5 l.) containing 1% of polyethyleneoxide monostearate as emulsifier in a 10 l. glass aspirator bottle A fitted with a level indicator B, stirrer C, and outlet tube D. Steam was passed through the heating jacket G surrounding the 1 l. glass beaker F containing stirrer H and thermometer O and screw clip E opened to admit 600 ml. of slurry into F. Stirrer H was started, tap E closed, and the contents of F allowed to reach a temperature of 90° C., the steam supply to G being adjusted to maintain this temperature.

10 minutes after the working temperature was reached, screw clip E was again opened and the slurry allowed to run in at 600 ml./hr., the rate being controlled by adjustment of the screw clip E and measured by the rate of change of volume in vessel A.

At the same time, the filter pump was started and screw clip J opened. Slurry was then drawn over through tube I into Buchner flask K, so as to keep the level in F constant. The steam supply to G was increased slightly to keep the temperature at 90° C. when continuous operation was established. Samples were taken at 15 minute intervals for the first 1½ hours of continuous operation and thereafter hourly by turning three-way tap L to switch the slurry collection to a similar Buchner flask K' through tube I' (not shown).

Flasks K and K' were cooled by cooling bath N, and each flask contained 2.5 g. of 2,6-ditertiarybutyl-4-methyl phenol in order to stop the degradation.

The average residence time of the polymer/peroxide slurry at 90° C. was approximately 1 hour.

Samples taken during the first 1½ hours of continuous operation gradually increased in melt index from the starting value of 0.2 to 5.1 and thereafter the melt index of the product remained substantially constant between 5.0 and 5.3 for a further 5½ hours when the run was discontinued.

In larger-scale operation it is convenient to replace the apparatus described by a tubular reactor having a high ratio of length to diameter. By this means the time taken to reach a steady state (and consequently the wastage of polymer) is very greatly reduced.

Very conveniently the tubular reactor is coupled to a heat exchanger in which the effluent slurry may be rapidly cooled.

Turbulent conditions in such tubes of course assist heat transfer.

Examples 6 and 7 demonstrate the accelerating effect of metals derived from the autoclave.

Example 6

A slurry of polypropylene (200 g.) in water (2 l.) containing 0.018% w./v. of polyethylene oxide monostearate and t-butyl hydroperoxide (1 g.) was heated in a 5 l. stainless steel autoclave for 4 hrs. at 120° C. The polypropylene obtained had a melt index at 190° C. of 266 whilst the starting material had a melt index of 0.1.

The polymer and water contained some rust after this treatment:

Polymer analysis:
 Before—
  Fe _____ 13 p.p.m.
 After degradation—
  Fe _____ 371 p.p.m.

The final melt viscosity is too low for practical utility in moulding and is of the range utilisable for fibre spinning.

Example 7

Example 6 was repeated, omitting the t-butyl hydroperoxide. The polymer after degradation had a melt index of 121.

Polymer analysis:
 Fe _____ 114 p.p.m.

It will be seen that the use of a metal autoclave led to extremely rapid degradation at 120° C., and that this was accelerated by t-butyl hydroperoxide.

By choice of the reaction temperature, free-radical catalyst (if used) and partial pressure of oxygen in the reactor the rate of degradation may be varied widely, to give polymers of melt index suitable for various applications; in general a suitable melt index for polymers for injection moulding is from 2 to 10, particularly from 2 to 3, as polymers of very high melt index tend to be brittle in such applications. For fibre formation, however, the melt index usually needs to be very much higher, and to cover most of the useful applications of polypropylene it is desirable to be able to obtain polymers of melt index within the range 1 to about 250.

I claim:

1. A thermal degradation process comprising heating a slurry in water, containing oxygen, of powdered solid crystalline polymer of an aliphatic mono-alpha-olefin, prepared by a low pressure process, at a temperature of from 60 to 250° C., so that free radicals are formed, and recovering from the slurry a polymer of increased melt index.

2. A process according to claim 1 in which the degradation is conducted at a temperature of 60–120° C. in the presence of oxygen and a free-radical catalyst.

3. A process according to claim 2 in which the degradation is conducted at a temperature of 60–100° C. and the free-radical catalyst is selected from the class consisting of diacyl peroxides, ketone peroxides, tertiary alkyl esters of organic carboxylic peracids, hydroxyl alkyl peroxides, and azodinitriles.

4. A process according to claim 2 in which the degradation is conducted at a temperature of 100–120° C. and the free-radical catalyst has a member of the group consisting of peroxide and hydroperoxide groups attached to a tertiary organic group selected from the class consisting of alkyl groups, cycloaliphatic groups, and aralkyl groups.

5. A process according to claim 1 in which the degradation is conducted at a temperature of 120–250° in the presence of oxygen but in the absence of free-radical catalyst.

6. A process according to claim 1 in which the crystalline polymer is isotactic polypropylene.

7. A process according to claim 1 operated continuously.

8. A process according to claim 7 in which an aqueous slurry of the solid olefine polymer is fed to a tubular reactor having a high ratio of length to diameter at a temperature of 120–250° C. and held therein for a residence time sufficient to increase the melt index to from 1 to 250.

9. A process according to claim 1 in which when the melt index of the polymer has reached the desired value further degradation is prevented by rapid cooling of the slurry.

10. A process according to claim 8 in which the slurry is rapidly cooled by continuously passing the hot slurry effluent from the tubular reactor through a heat exchanger to prevent further degradation of the polymer.

11. A process according to claim 1 in which when the melt index of the polymer has reached the desired value further degradation of the polymer is prevented by the addition to the slurry of an inhibitor.

12. A process according to claim 11 in which the inhibitor is a phenol.

13. A process according to claim 12 in which the weight of phenol is at least twice the weight of free-radical catalyst.

14. A process according to claim 2 in which the weight of free-radical catalyst is from 0.1 to 1% by weight of the olefine polymer.

15. A process according to claim 1 in which the polymer has an initial melt index of from 0.01 to 1.

16. A process according to claim 1 in which the polymer has a final melt index of from 1 to 250.

17. A process according to claim 16 in which the polymer has a final melt index of from 2 to 10.

18. A process according to claim 17 in which the polymer has a final melt index of from 2 to 3.

References Cited by the Examiner

UNITED STATES PATENTS 3,110,708   11/1963   Wisseroth _____ 260—94.9

FOREIGN PATENTS 476,476   1/1944   Canada.

JOSEPH L. SCHOFER, *Primary Examiner.*

MORRIS LIEBMAN, *Examiner.*

J. L. SCHOFER, F. L. DENSON, *Assistant Examiners.*